(12) United States Patent
Pfefferl et al.

(10) Patent No.: US 8,718,848 B2
(45) Date of Patent: May 6, 2014

(54) STATE OF CHARGE ADJUSTED COMPRESSOR CONTROL

(75) Inventors: David J. Pfefferl, Broadview Heights, OH (US); Mark A. Matko, North Olmsted, OH (US); Marv Hamdan, North Olmsted, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 324 days.

(21) Appl. No.: 13/246,143

(22) Filed: Sep. 27, 2011

(65) Prior Publication Data
US 2012/0316713 A1 Dec. 13, 2012

Related U.S. Application Data

(60) Provisional application No. 61/494,491, filed on Jun. 8, 2011.

(51) Int. Cl.
*G06F 7/00* (2006.01)
(52) U.S. Cl.
USPC ............................................. 701/22

(58) Field of Classification Search
USPC ............................ 701/22, 36, 69, 86, 99, 100
See application file for complete search history.

(56) References Cited

U.S. PATENT DOCUMENTS

| | | | |
|---|---|---|---|
| 5,995,347 A | 11/1999 | Rudd et al. | |
| 6,484,833 B1 * | 11/2002 | Chhaya et al. | 180/65.225 |
| 6,684,863 B2 | 2/2004 | Dixon et al. | |
| 7,377,345 B2 | 5/2008 | Hasuka et al. | |
| 7,886,553 B2 | 2/2011 | Joergensen et al. | |
| 2010/0158702 A1 | 6/2010 | Colavincenzo | |
| 2012/0226406 A1 * | 9/2012 | Kaita et al. | 701/22 |

* cited by examiner

*Primary Examiner* — Kim T Nguyen
(74) *Attorney, Agent, or Firm* — Fay Sharpe LLP

(57) ABSTRACT

The described systems and methods relate to employing an Electric Air Charging System (EACS) to maintain a hybrid commercial vehicle (or the like) battery within a desired range of charge. The innovation facilitates reducing battery charge when the state of charge is too high, such as by adjusting air compressor cut-in and cut-out pressure thresholds to cause the air compressor to compress air for the brake system when there is excess charge in the battery, as well as triggering a brake regeneration protocol and/or other charge regeneration protocol(s) to restore charge to the battery when the state of charge of the battery is too low.

22 Claims, 3 Drawing Sheets

STATE OF CHARGE ADJUSTED COMPRESSOR CONTROL

CROSS-REFERENCE TO RELATED APPLICATIONS

This application claims priority to U.S. Provisional Application No. 61/494,491, entitled CURRENT CONTROL VIA SPEED CONTROL FOR DRIVING SCREW COMPRESSOR UNDER COLD CONDITIONS, and filed on Jun. 8, 2011.

BACKGROUND

The present application finds particular application in controlling compressors for commercial hybrid vehicles. However, it will be appreciated that the described technique may also find application in other compressor systems, other vehicular systems, or other control systems.

In conventional screw-type compressors, an example of an electrically controlled compressor, a pair of helical screws or rotors is employed to compress a gas, such as air. Oil-filled screw compressors employ a lubricant that fills the space between the rotors. The lubricant provides a hydraulic seal and transfers mechanical energy between the screws. Air enters at a suction side and moves through the threads as the screws rotate. In this manner, the rotors force the air through the compressor until it exits at the end of the screws.

Currently in heavy duty hybrid vehicle design, there is an effort to electrify vehicle subsystems to move them off the engine. As these subsystems are electrified, there is a need to intelligently control and optimize their power usage to be in concert with the entire vehicle electrical system. For example, there is a problem with existing electric air compressor subsystems within heavy duty hybrid vehicles. Presently, electric air compressor systems are not designed to manage and modify their operation to control and optimize the energy used to charge the air tanks for air brake and other pneumatic systems. That is, conventional electric compressor systems on heavy duty hybrid vehicles do not include an intelligent control of the energy required to maintain the air pressure. These systems do not monitor and utilize existing vehicle information to modify their operation to optimize energy conservation.

Existing compressor systems normally turn the compressor On or Off at fixed speeds and pressures. For instance, the compressor is On at full speed at the lower pressure (CUT IN) and Off at the higher pressure (CUT OUT). Existing electric compressor systems cannot dynamically alter their operation to help conserve and store energy. These electric compressor systems have no means to optimize the energy usage required to maintain the vehicle air pressure or modify the compressor operation based upon vehicle status or energy demands.

Presently, compressor control systems do not have the capability to dynamically vary the motor speed (RPM) or change the CUT IN and CUT OUT pressure thresholds as vehicle operational status and power requirements change. Vehicle operational status information is available on the vehicle communication bus (J1939 CAN or equivalent). There is a problem with existing systems in that these systems do not communicate over the bus or use available information to modify the electric compressor operation to be in harmony with the vehicle system to conserve energy. Moreover, existing air compressor control systems cannot modify their operation based on the high voltage battery state of charge (SOC). Existing systems do not access or use information regarding the SOC or the status of brake energy available for regenerative braking (regen) so as to optimize energy usage.

The present innovation relates to systems and methods that overcome the above-referenced problems and others.

SUMMARY

In accordance with one aspect, an energy management system that facilitates maintaining a hybrid commercial vehicle high-voltage battery within a predetermined state of charge (SOC) range includes an air compressor that is operably coupled to a motor control unit (MCU) and powered by the vehicle high-voltage battery. The system further includes a processor in the MCU that executes computer-executable instructions, which are stored on a computer-readable medium, including instructions for detecting a state of charge for the vehicle high voltage battery, comparing the detected state of charge to at least a first SOC threshold and a second SOC threshold that is lower than the first SOC threshold; and increasing a cut-in pressure threshold and a cut-out pressure threshold for the air compressor and increasing the revolutions per minute (RPM) of a motor connected to the compressor if the detected SOC is greater than or equal to the first SOC threshold, such that the air compressor begins compressing air at a higher-than-nominal pressure level and draws charge from the vehicle high-voltage battery to reduce the SOC thereof. The processor further executes stored instructions for reducing the cut-in pressure threshold and the cut-out pressure threshold for the air compressor, and reducing motor speed, if the detected SOC is less than or equal to the second SOC threshold, such that the air compressor begins compressing air at a lower-than-nominal pressure level thereby conserving SOC of the vehicle high-voltage battery.

According to another aspect, a method of maintaining a hybrid commercial vehicle high voltage battery within a predetermined state of charge (SOC) range includes detecting a state of charge for the vehicle high voltage battery, and comparing the detected state of charge to at least a first SOC threshold and a second SOC threshold that is lower than the first SOC threshold. The method further includes increasing a cut-in pressure threshold and a cut-out pressure threshold for an air compressor coupled to the vehicle high voltage battery and increasing the revolutions per minute (RPM) of a motor connected to the compressor if the detected SOC is greater than or equal to the first SOC threshold, such that the air compressor begins compressing air at a higher-than-nominal pressure level and draws charge from the vehicle high voltage battery to reduce the SOC thereof. Additionally, the method includes reducing the cut-in pressure threshold and the cut-out pressure threshold for the air compressor, and reducing motor speed, if the detected SOC is less than or equal to the second SOC threshold, such that the air compressor begins compressing air at a lower-than-nominal pressure level thereby conserving SOC of the vehicle high voltage battery.

According to another aspect, a controller that maintains a hybrid commercial vehicle high voltage battery within a predetermined state of charge (SOC) range includes a processor connected to a motor that powers an air compressor, wherein the processor executes computer-executable instructions, which are stored on a computer-readable medium, including instructions for detecting a state of charge for the vehicle high voltage battery, which provides power to the motor, and for comparing the detected state of charge to at least a first SOC threshold and a second SOC threshold that is lower than the first SOC threshold. The instructions further include increasing a cut-in pressure threshold and a cut-out pressure threshold for the air compressor and increasing the revolutions per minute (RPM) of the motor if the detected SOC is greater than or equal to the first SOC threshold, in order to cause the air compressor to begin compressing air at a higher-than-nominal pressure level and draw charge from the vehicle high voltage battery to reduce the SOC thereof. Additionally, the instructions include reducing the cut-in pressure threshold and the cut-out pressure threshold for the air compressor, and reducing motor speed, if the detected SOC is less than or equal to the second SOC threshold, in order to cause the air compressor to begin compressing air at a lower-than-nominal pressure level thereby conserving SOC of the vehicle high voltage battery.

According to another aspect, an apparatus for maintaining a hybrid commercial vehicle high voltage battery within a predetermined state of charge (SOC) range includes a state of charge detecting means for detecting a state of charge for the vehicle high voltage battery, and a processing means for comparing the detected state of charge to at least a first SOC threshold and a second SOC threshold that is lower than the first SOC threshold. The processing means increases a cut-in pressure threshold and a cut-out pressure threshold for an air compressor coupled to the vehicle high voltage battery and increasing the revolutions per minute (RPM) of a motor connected to the compressor if the detected SOC is greater than or equal to the first SOC threshold, such that the air compressor begins compressing air at a higher-than-nominal pressure level and draws charge from the vehicle high voltage battery to reduce the SOC thereof. Additionally, the processing means reduces the cut-in pressure threshold and the cut-out pressure threshold for the air compressor, and reducing motor speed, if the detected SOC is less than or equal to the second SOC threshold, such that the air compressor begins compressing air at a lower-than-nominal pressure level thereby conserving SOC of the vehicle high voltage battery.

One advantage is that vehicle battery life is improved.

Another advantage is that compressor reliability and operational life are improved.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

Figure 1:
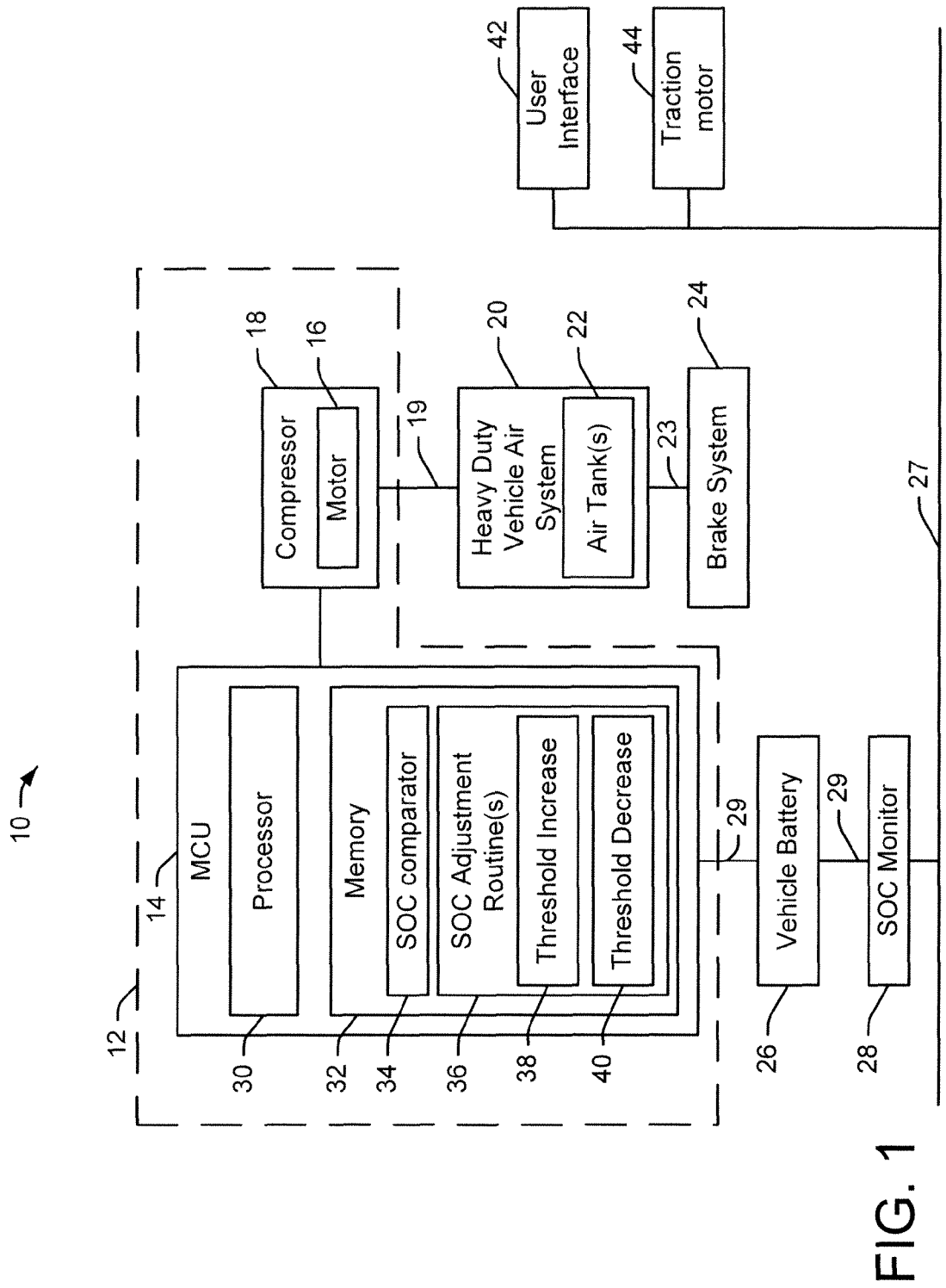
FIG. 1 illustrates an energy management system that employs an energy management algorithm that employs an Electric Air Charging System (EACS).

FIG. 1 illustrates an energy management system 10 that executes an energy management algorithm employing an Electric Air Charging System (EACS) 12 to maintain a hybrid commercial vehicle (or the like) high voltage battery (e.g., 200V, 300V, or some other high voltage battery) within a desired range of charge. For instance, a desired range for a given battery may be between approximately 40% and 90% of full charge, although other desired ranges of charge may be employed in conjunction with the herein-described features. Desired charge ranges may also vary with battery type, motor type, drive electronics, etc., and can be pre-programmed. If the battery charge is too high or too low, battery life may be negatively affected. If the battery charge is too low, there may be insufficient charge to power systems such as an air compressor that supplies compressed air to a braking system. Accordingly, the system facilitates reducing battery charge when the state of charge is too high (e.g., above 90% in this example), such as by adjusting air compressor cut-in and cut-out thresholds to cause the air compressor to compress air for the brake system when there is excess charge in the battery, as well as triggering a brake regeneration protocol or other charge regeneration protocol to restore charge to the battery when the state of charge of the battery is too low (e.g., below approximately 40% of full charge in this example). The described technology is integrated within motor controller unit (MCU) firmware architecture. In another embodiment, the described technology is integrated into an on-board air compressor on a vehicle.

The EACS 12 comprises an MCU 14 that controls a variable speed, brushless DC (BLDC) motor 16 that drives an electric compressor 18. Other prime movers, such as an induction motor, are also contemplated. Electric compressor technologies employed in conjunction with the herein-described features can include by way of example and not limitation reciprocating, screw, scroll, rotary, and/or any other suitable type of compressor. The electric compressor 18 compresses the air and provides, via an air supply line 19, an air pressure supply to a heavy duty vehicle air system 20 that comprises one or more air tanks 22 that are filled by the compressor 18 and which supply air pressure via an air supply line 23 to a brake system 24. The herein-described approach provides intelligent and variable control of the air supply based on vehicle operational status in order to manage and improve energy efficiency within a hybrid commercial vehicle or other vehicle.

The MCU 14 communicates with other vehicle controllers (not shown) and acquires vehicle operational status (e.g., state of charge) of a high voltage battery 26 of the vehicle or the like over the vehicle serial bus 27 (e.g. a J1939 controller area network (CAN) bus or the like). Although the battery described herein is a high voltage vehicle battery, it will be appreciated that the described systems and methods may be employed with any suitable power source, as well as with any suitable air compressor or load on the power source. The MCU continuously or periodically monitors vehicle operational status in order to intelligently control the energy required to maintain vehicle air pressure. The intelligent control approach regulates the vehicle's air tank pressure to be in concert with other vehicle controllers and vehicle operational status by varying the compressor motor speed and pressure thresholds. The MCU monitors the SOC of the vehicle battery 26 to determine whether there is capacity to store brake regeneration energy and/or whether there is electrical energy available to charge the air tanks 22. The battery may be, for example, a lithium ion battery, a nickel metal hydride battery, a lead acid battery, a variant of the foregoing battery types, or any other suitable battery. The battery 26 is coupled via power lines 29 to the SOC monitor and the MCU.

The EACS comprises a state of charge (SOC) monitor 28 that monitors the SOC of the vehicle battery (e.g., periodically or continuously) and provides SOC information to a processor 30. In another embodiment, SOC is monitored by a software module (not shown) stored in a memory 32 and executed by the processor 30. The SOC monitor may also be a in a unit separate from the MCU and received by the MCU over the serial bus 27. The memory 32 stores an SOC comparator module 34 that, when executed by the processor, compares received SOC information to one or more SOC thresholds to determine whether the battery has capacity for storing additional charge or whether battery charge is excessive and can be reduced to improve battery life or the like. The memory additionally stores one or more SOC adjustment routines 36 for adjusting (e.g., increasing or decreasing) battery charge state. In one embodiment, the processor 30 and memory 32 are integral to the air compressor unit and/or the EACS.

The memory 32 may include volatile, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 30. Additionally, "module," as used herein denotes a set of computer-executable instructions (e.g., a routine, sub-routine, program, application, or the like) that is persistently stored on the computer-readable medium or memory for execution by the processor.

If the SOC is high as determined by the SOC comparator 34, there may be little capacity for subsequent brake energy regeneration. To improve energy conservation, the processor initiates a threshold increase SOC adjustment routine 38 that raises the compressor CUT_IN and CUT_OUT pressure thresholds and runs the compressor at higher RPM in order to quickly store air at a higher pressure. Additionally or alternatively, the MCU processor can keep the compressor running in order to maintain the air pressure just below the CUT_OUT pressure threshold, thereby maintaining the higher pressure and continuing the draw on the SOC. The compressor is run at a lower speed to maintain a load on the high voltage battery but will not build air as quickly as at the higher speed. This approach both saves energy as higher air pressure and lowers the SOC, freeing up battery storage capacity. The higher air pressure is then available for subsequent braking events while the lower SOC permits capacity for brake energy regeneration opportunities.

If the SOC is low as determined by the SOC comparator 34, there is relatively less energy available to drive the compressor. In this case, the MCU processor conserves SOC by initiating a threshold decrease SOC adjustment routine 40 that reduces the pressure thresholds and compressor RPM. Additionally, the MCU can send an alert to the driver via a user interface 42 to initiate a generator regeneration protocol, such as by engaging a traction motor 44 and/or initiating brake energy regeneration to recharge the battery 26. The traction motor also serves as an energy regeneration device. In another embodiment, the MCU automatically sends a command directly to the traction motor 44 to recharge the battery to a nominal level (e.g., 70% of full charge or more). The MCU thus controls the compressor to more slowly build air pressure to a lower pressure threshold using less energy and conserving SOC until brake regeneration restores the SOC. By monitoring the SOC and modifying the compressor operation, brake regeneration is facilitated. Increased brake regeneration opportunities result in improved energy recovery, less brake wear, and safer vehicle operation.

In another embodiment, the compressor is run at a low speed (i.e., too low to compress air) when an excessive SOC is detected, in order to return the SOC of the battery to the desired SOC range. Additionally or alternatively, the MCU can send a signal to an air dryer to repeatedly or continuously purge air, which reduces pressure in the tanks 22 and causes the compressor to run to increase air pressure in the tanks, which in turn reduces the SOC of the battery until it is within the desired SOC range. For example, on a long down-hill grade, brake regeneration can recharge the vehicle battery to above 90% (or some other predetermined upper threshold), potentially reaching 100% SOC, which can decrease battery life. Therefore, the described features and techniques can be employed to reduce or dissipate charge from the battery by causing the air compressor to run and store compressed air. This in turn permits the brake regeneration protocols to be used more frequently, which reduces brake pad wear.

According to another embodiment, the compressor operates to keep the air tanks near a maximum desired pressure (i.e., the cut-in pressure threshold for the compressor is set just below maximum pressure) in order to keep the SOC relatively constant.

It will be appreciated that although the herein-described systems and methods relate to an air compressor system that is manipulated to control vehicle battery SOC, any suitable electrical system on the vehicle (e.g., a hydraulic system, etc.) may be employed in a similar fashion, and that the described systems and methods are not limited to being employed in conjunction with an air compressor.

It will further be appreciated that although FIG. 1 depicts the system 10 as comprising an air compressor that is operably coupled to an MCU that performs the described functions, in another embodiment the processor 30 and memory 32 are integral to the air compressor 18 and/or the EACS component 12.

Figure 2:
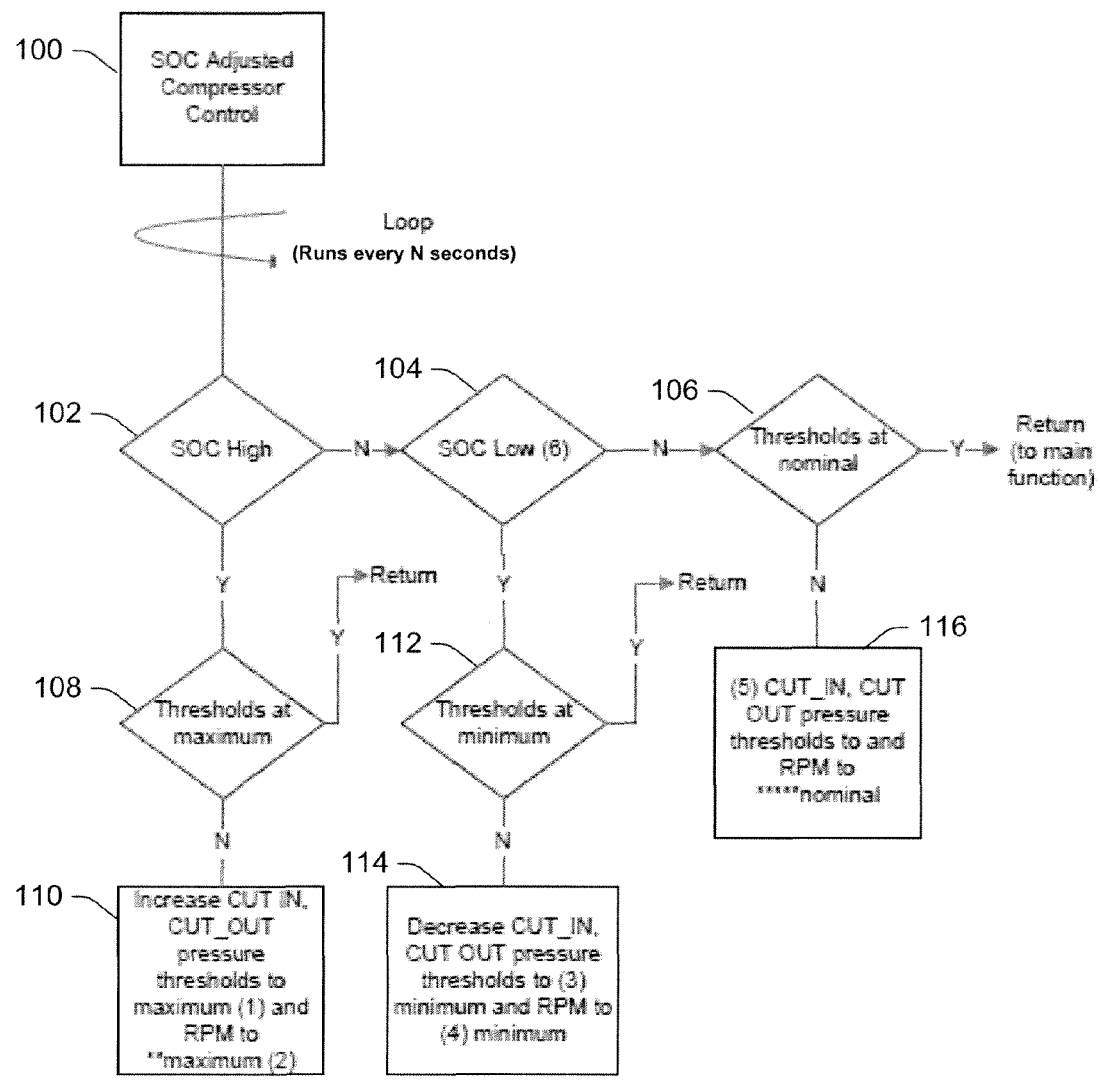
FIG. 2 illustrates a method for modifying air tank pressure thresholds and compressor RPM to be in concert with vehicle battery state of charge (SOC).

FIG. 2 illustrates a method for modifying air tank pressure thresholds and compressor RPM to be in concert with vehicle battery state of charge (SOC), such as may be performed by the system of FIG. 1. The described embodiments improve energy usage by monitoring total vehicle system power requirements and managing and controlling electric compressor power accordingly. Compressor operation is modified based on the vehicle SOC for improved energy use. In one embodiment, through J1939 CAN communication, a controller has knowledge of vehicle subsystems power requirements and can communicate with these subsystems to improve energy usage (engine, transmission, brake, etc.). With this information, the electric energy usage is managed and controlled to be in concert with vehicle's total power requirements to facilitate energy regeneration and recovery (e.g., from a brake system).

The SOC is a percentage of full charge (e.g., 0-100%). However, for illustrative purposes, the SOC is described herein as being "high" or "low." That is, if the SOC is high (e.g., above a predetermined threshold such as 75% or the like), then brake energy is not regenerated or recycled, since the battery is charged. In this case, RPM and pressure thresholds for the compressor can be increased and the compressor is permitted to use a portion of the battery charge to quickly build more air pressure. This in turn consumes battery charge thereby reducing the SOC, which in turn permits brake energy to be employed to regenerate battery charge. If the SOC is low (e.g., below the predetermined threshold), then there is less energy available to drive the compressor. In this case, to preserve the SOC, the pressure thresholds and RPM are reduced in order to permit the compressor to build up to a lower presser level and spin more slowly, which in turn conserves power while still providing air to the system.

Accordingly, at 100, an SOC adjusted compressor control routine is initiated or run. The control routine runs continuously or periodically, such as in a looped routine that is run every N seconds. At 102, a determination is made regarding whether SOC is high (e.g., above a first predetermined SOC threshold). If not, then at 104, a determination is made regarding whether the SOC is low (e.g., below a second predetermined SOC threshold that is lower than the first predetermined SOC threshold). If the SOC is neither high nor low, then at 106 a determination is made regarding whether the first and second thresholds are at nominal or normal values. If so, the routine returns to a main function. That is, the control routine terminates until it is restarted after N seconds.

If, at 102, it is determined that the SOC is high, then at 108 a determination is made regarding whether the compressor pressure and RPM threshold levels are at maximum levels. If so, then the routine terminates until a subsequent control routine loop begins. If not, then at 110, compressor pressure and RPM thresholds are raised up to a maximum level. For instance, the pressure CUT_IN (e.g., ON) and CUT_OUT (e.g., OFF) pressure thresholds are increased to a maximum level (e.g., 165 PSIG and 185 PSIG, respectively, or some other suitable predetermined maximum pressure threshold levels), and the RPM threshold level is raised to a maximum RPM threshold level (e.g., approximately 3500 RPM or some other suitable maximum threshold level). It will be appreciated that the examples of pressure and RPM threshold levels described herein are given by way of example only and are not intended to limit the scope of the described embodiments. In one example, the CUT_OUT pressure threshold is a function of a compressor pressure upper limit. For instance, if the upper limit of the compressor is 220 PSIG, then the CUT_OUT maximum pressure threshold level of 185 PSIG, is safely 35 PSI below the maximum pressure rating for the compressor.

If the determination at 104 indicates that the SOC is below the second predetermined threshold, then at 112 a determination is made regarding whether the compressor pressure and RPM thresholds are at minimum levels. If so, then the control routine terminates (i.e., returns to a main function) until it is re-started after N seconds. If not, then at 114, CUT_IN and CUT_OUT pressure thresholds and the RPM threshold are reduced to minimum threshold levels. For instance, the CUT_IN and CUT_OUT minimum pressure threshold levels can be reduced to 100 PSIG and 120 PSIG, respectively, in the example where the compressor has a maximum pressure rating of 220 PSIG. The RPM minimum threshold level can be reduced to approximately 2400 RPM, in this example.

If the determination at 106 indicates that the thresholds are not at nominal levels, then at 116 the CUT_IN, CUT_OUT and RPM thresholds are set to nominal levels. In one example, the nominal CUT_IN and CUT_OUT pressure thresholds are 110 PSIG and 130 PSIG, respectively, and the nominal RPM threshold level is approximately 2860 RPM. In this manner, the control routine ensures that the SOC and air tank pressure are adequate to build air for a predetermined number of brake applications before the SOC is too low to run the air compressor.

Figure 3:
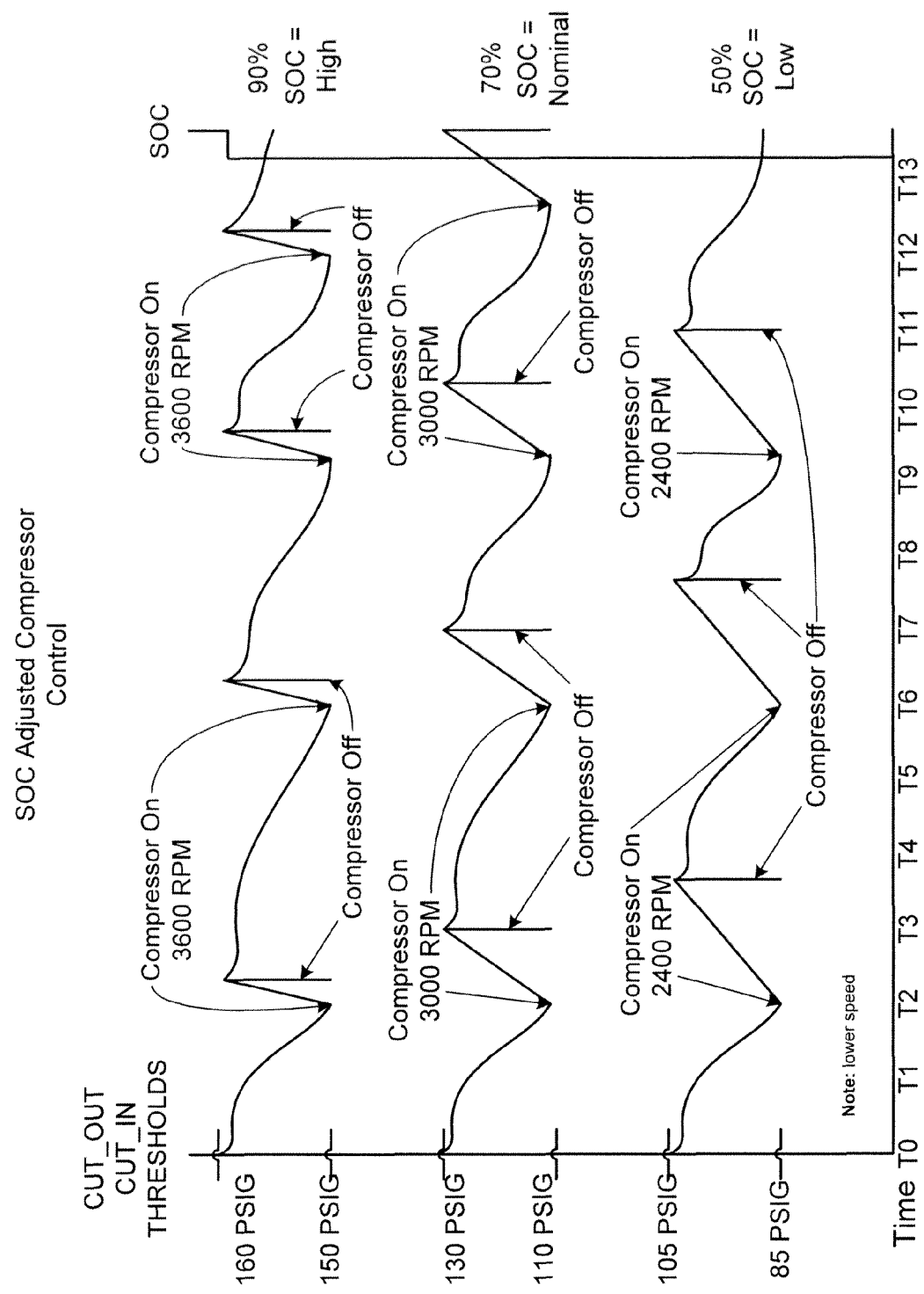
FIG. 3 illustrates a chart that correlates SOC to compressor pressure thresholds with respect to time.

FIG. 3 illustrates a chart 200 that correlates SOC to compressor pressure thresholds with respect to time. When the SOC is high, the batteries are charged and there is limited capacity to store brake energy. To create storage capacity in the batteries, a portion of the SOC is consumed by increasing pressure and RPM thresholds. In this manner air pressure is rapidly built and SOC is reduced so that brake energy can be stored or regenerated as it becomes available.

When the SOC is low, the vehicle batteries are low and there is less energy available to drive the compressor. To conserve SOC, the pressure and RPM thresholds for the compressor are reduced. The compressor thus builds to a lower pressure level and spins more slowly, thereby consuming less battery energy.

According to the example illustrated by the chart 200, which is illustrative in nature and not intended to limit the herein-described embodiments, when SOC is high (e.g., above 90% of full charge), the compressor CUT_IN and CUT_OUT pressure thresholds are set to 140 PSIG and 160 PSIG, respectively, and the compressor is permitted to run at 3600 RPM. When SOC is low (e.g., below 50% of full charge), the compressor CUT_IN and CUT_OUT pressure thresholds are set to 85 PSIG and 105 PSIG, respectively, and the compressor is permitted to run at 2400 RPM. When SOC is nominal (e.g., 70% of full charge or anywhere below the high SOC threshold and above the low SOC threshold), the compressor CUT_IN and CUT_OUT pressure thresholds are set to 110 PSIG and 130 PSIG, respectively, and the compressor is permitted to run at 3000 RPM.

It will be appreciated that any number of intermediate nominal pressure and RPM thresholds can be employed, along with any number of nominal SOC thresholds, in order to increase granularity of the described systems and methods. For instance, in the described example, nominal SOC thresholds of 55%, 65% and so on up to the high SOC threshold of 90% can be employed. In this example, if the SOC is determined to be 80%, then the CUT_IN and CUT_OUT pressure thresholds can be set to 125 PSIG and 145 PSIG, respectively, and the maximum RPM threshold can be set to 3300 RPM. In another embodiment, the nominal SOC thresholds are defined at each percent of full charge (e.g., 51%, 52%, . . . , 89%) and the maximum pressure and RPM thresholds are correlated accordingly. By increasing the granularity of the scaled responses to SOC, compressor wear can be mitigated and life-span improved.

According to another example, a desired range for a particular vehicle battery type is between 40% and 95% of full charge. If the SOC is determined to be below a first predetermined charge threshold (e.g., 60% of full charge), then the system issues a regeneration alert that is presented to a driver via user interface 42 (FIG. 1) (e.g., an onboard computer interface, a light or audible signal, or any other suitable manner of alerting the driver) to alert the driver to brake less aggressively to permit brake regeneration and increase SOC. In this manner, the system facilitates ensuring that there is sufficient SOC to run the electric compressor (and/or other vehicle systems) while increasing the number of brake regeneration opportunities.

To continue this example, if SOC is below a second predetermined charge threshold (e.g., 55% of full charge) and air pressure in the tanks 22 is approaching a first predetermined pressure threshold (e.g., 105 psig or the like), then the system sends a requests that the SOC be recharged via a traction motor 44 (FIG. 1) (i.e., a "generator regen request" is triggered to cause the traction motor to act as a generator). In this manner, sufficient SOC for running the electric compressor is maintained, as well as sufficient air pressure for operating the brake system. Both of these features contribute to improved vehicle safety.

If the SOC and the air pressure are critically close (e.g., within 5% or so) of their respective predetermined lower limits (e.g., 45% of full charge and 80 psig, respectively, or some other predetermined thresholds), then the MCU automatically sends a message or signal to the traction motor 44 to act as a generator and recharge the battery (i.e., an "initiate generator regen" message). In this manner, sufficient SOC for compressor operation and sufficient air for the brake system are ensured, which contribute to overall vehicle safety.

According to another embodiment, if the battery SOC is sufficiently high and the air tanks have been filled to capacity, then the MCU can spin the air compressor at a speed lower than is required to build air pressure. In this mode, the SACS acts as a load to the electrical system, and draws down the SOC of the battery.

In another embodiment, if the battery SOC is sufficiently high and the air tanks have been filled to capacity, then the MCU can send a signal to a solenoid (not shown) to bleed off air at a controlled rate to reduce pressure in the tanks, which causes the compressor to run to maintain air pressure in the tanks, which in turn reduces the SOC of the battery until it is within the desired SOC range while the compressor concurrently maintains the air pressure at or near the upper limit.

According to another embodiment, the described systems and methods are employed in a manner that facilitates comparing a detected or monitored SOC for the high-voltage battery to a plurality of different SOC thresholds and initiating a variety of actions to adjust the SOC as a function of the comparison. For instance, a state of charge for the vehicle high voltage battery can be detected and compared to at least a first SOC threshold and a second SOC threshold that is lower than the first SOC threshold. If the detected SOC is greater than or equal to the first SOC threshold, a cut-in pressure threshold and a cut-out pressure threshold for the air compressor are increased and the revolutions per minute (RPM) of a motor connected to the compressor are increased such that the air compressor begins compressing air at a higher-than-nominal pressure level and draws charge from the vehicle high-voltage battery to reduce the SOC thereof. If the detected SOC is less than or equal to the second SOC threshold, the cut-in pressure threshold and the cut-out pressure threshold for the air compressor are reduced, as is the motor speed, such that the air compressor begins compressing air at a lower-than-nominal pressure level thereby conserving SOC of the vehicle high-voltage battery.

In a related embodiment, the detected SOC can be compared to a third SOC threshold that is higher than the second SOC threshold and that is lower than the first SOC threshold, and if the detected SOC is between the second SOC threshold and the third SOC threshold, an alert is sent to a user interface that prompts a driver of the vehicle to brake less aggressively to promote brake regeneration opportunities to increase the SOC of the vehicle high-voltage battery. The detected SOC can further be compared to a fourth SOC threshold that is higher than the second SOC threshold and lower than the third SOC threshold. If the detected SOC is between the second SOC threshold and the fourth SOC threshold, a system-wide request to permit activation of a traction motor as a generator to recharge the vehicle high-voltage battery to a predetermined SOC can be transmitted. Still furthermore, the detected SOC can be compared to a fifth SOC threshold that is higher than the second SOC threshold and that is lower than the fourth SOC threshold. If the detected SOC is between the second SOC threshold and the fifth SOC threshold, a traction motor can be automatically activated as a generator to recharge the vehicle high-voltage battery to a predetermined SOC.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. An energy management system that facilitates maintaining a hybrid commercial vehicle high-voltage battery within a predetermined state of charge (SOC) range, including:
    an air compressor that is operably coupled to a motor control unit (MCU) and powered by the vehicle high-voltage battery; and
    a processor in the MCU that executes computer-executable instructions, which are stored on a non-transitory computer-readable medium, including instructions for:
    detecting a state of charge for the vehicle high voltage battery;
    comparing the detected state of charge to at least a first SOC threshold and a second SOC threshold that is lower than the first SOC threshold;
    increasing a cut-in pressure threshold and a cut-out pressure threshold for the air compressor and increasing revolutions per minute (RPM) of the motor connected to the air compressor if the detected SOC is greater than or equal to the first SOC threshold, such that the air compressor begins compressing air at a higher-than-nominal pressure level and draws charge from the vehicle high-voltage battery to reduce the detected SOC thereof; and
    reducing the cut-in pressure threshold and the cut-out pressure threshold for the air compressor, and reducing motor speed, if the detected SOC is less than or equal to the second SOC threshold, such that the air compressor begins compressing air at a lower-than-nominal pressure level thereby conserving the detected SOC of the vehicle high-voltage battery.

2. The system according to claim 1, wherein the instructions further include:
    upon determining that the detected SOC is equal to or less than the second SOC threshold, sending a command to a traction motor which, upon receiving the command, acts as a generator to recharge the vehicle high-voltage battery to a desired SOC.

3. The system according to claim 1, wherein the instructions further include:
    upon determining that the detected SOC is equal to or greater than the first SOC threshold, sending a command to a traction motor which, upon receiving the command, acts as a load on the vehicle high voltage battery to reduce a charge on the vehicle high-voltage battery to a desired SOC.

4. The system according to claim 1, wherein the instructions further include:
    comparing the detected state of charge to a third SOC threshold that is higher than the second SOC threshold and that is lower than the first SOC threshold; and
    when the detected SOC is between the second SOC threshold and the third SOC threshold, sending an alert to a user interface that prompts a driver of a vehicle comprising the high voltage vehicle battery to brake less aggressively to promote brake regeneration opportunities to increase the detected SOC of the vehicle high-voltage battery.

5. The system according to claim 4, wherein the instructions further include:
    comparing the detected state of charge to a fourth SOC threshold that is higher than the second SOC threshold and that is lower than the third SOC threshold; and
    when the detected SOC is between the second SOC threshold and the fourth SOC threshold, sending a system-wide request to permit activation of a traction motor as a generator to recharge the vehicle high-voltage battery to a predetermined SOC.

6. The system according to claim 5, wherein the instructions further include:
comparing the detected state of charge to a fifth SOC threshold that is higher than the second SOC threshold and that is lower than the fourth SOC threshold; and
when the detected SOC is between the second SOC threshold and the fifth SOC threshold, automatically activating the traction motor as a generator to recharge the vehicle high-voltage battery to the predetermined SOC.

7. The system according to claim 1, wherein the predetermined state of charge (SOC) range is from 40% to 95% of a maximum charge that can be stored by the vehicle high-voltage battery.

8. The system according to claim 1, wherein the first SOC threshold is approximately 90% of a maximum charge that can be stored by the vehicle high-voltage battery, and wherein the second threshold is approximately 45% of the maximum charge that can be stored by the vehicle high-voltage battery.

9. A method of maintaining a hybrid commercial vehicle high voltage battery within a predetermined state of charge (SOC) range, including:
detecting a state of charge for the vehicle high voltage battery; and
via a processor:
comparing the detected state of charge to at least a first SOC threshold and a second SOC threshold that is lower than the first SOC threshold;
increasing a cut-in pressure threshold and a cut-out pressure threshold for an air compressor coupled to the vehicle high voltage battery and increasing revolutions per minute (RPM) of a motor connected to the air compressor if the detected SOC is greater than or equal to the first SOC threshold, such that the air compressor begins compressing air at a higher-than-nominal pressure level and draws charge from the vehicle high voltage battery to reduce the detected SOC thereof; and
reducing the cut-in pressure threshold and the cut-out pressure threshold for the air compressor, and reducing motor speed, if the detected SOC is less than or equal to the second SOC threshold, such that the air compressor begins compressing air at a lower-than-nominal pressure level thereby conserving the detected SOC of the vehicle high voltage battery.

10. The method according to claim 9, further comprising:
upon determining that the detected SOC is equal to or less than the second SOC threshold, sending a command to a traction motor which, upon receiving the command, acts as a generator to recharge the vehicle high voltage battery to a desired SOC.

11. The method according to claim 9, further comprising:
comparing the detected state of charge to a third SOC threshold that is higher than the second SOC threshold and that is lower than the first SOC threshold; and
when the detected SOC is between the second SOC threshold and the third SOC threshold, sending an alert to a user interface that prompts a driver of a vehicle comprising the high voltage vehicle battery to brake less aggressively to promote brake regeneration opportunities to increase the detected SOC of the vehicle high voltage battery.

12. The method according to claim 11, further comprising:
comparing the detected state of charge to a fourth SOC threshold that is higher than the second SOC threshold and that is lower than the third SOC threshold; and
when the detected SOC is between the second SOC threshold and the fourth SOC threshold, sending a system-wide request to permit activation of a traction motor as a generator to recharge the vehicle high voltage battery to a predetermined SOC.

13. The method according to claim 12, further comprising:
comparing the detected state of charge to a fifth SOC threshold that is higher than the second SOC threshold and that is lower than the fourth SOC threshold; and
when the detected SOC is between the second SOC threshold and the fifth SOC threshold, automatically activating the traction motor as a generator to recharge the vehicle high voltage battery to the predetermined SOC.

14. The method according to claim 9, wherein the predetermined state of charge (SOC) range is from 40% to 95% of a maximum charge that can be stored by the vehicle high voltage battery.

15. The method according to claim 9, wherein the first SOC threshold is approximately 90% of a maximum charge that can be stored by the vehicle high-voltage battery, and wherein the second threshold is approximately 45% of the maximum charge that can be stored by the vehicle high voltage battery.

16. A controller that maintains a hybrid commercial vehicle high voltage battery within a predetermined state of charge (SOC) range, comprising:
a processor connected to a motor that powers an air compressor, wherein the processor executes computer-executable instructions, which are stored on a non-transitory computer-readable medium, including instructions for:
detecting a state of charge for the vehicle high voltage battery, which provides power to the motor;
comparing the detected state of charge to at least a first SOC threshold and a second SOC threshold that is lower than the first SOC threshold;
increasing a cut-in pressure threshold and a cut-out pressure threshold for the air compressor and increasing revolutions per minute (RPM) of the motor if the detected SOC is greater than or equal to the first SOC threshold, in order to cause the air compressor to begin compressing air at a higher-than-nominal pressure level and draw charge from the vehicle high voltage battery to reduce the detected SOC thereof; and
reducing the cut-in pressure threshold and the cut-out pressure threshold for the air compressor, and reducing motor speed, if the detected SOC is less than or equal to the second SOC threshold, in order to cause the air compressor to begin compressing air at a lower-than-nominal pressure level thereby conserving the detected SOC of the vehicle high voltage battery.

17. The controller according to claim 16, wherein the instructions further include:
upon determining that the detected SOC is equal to or less than the second SOC threshold, sending a command to a traction motor which, upon receiving the command, acts as a generator to recharge the vehicle high voltage battery to a desired SOC.

18. The controller according to claim 16, wherein the instructions further include:
comparing the detected state of charge to a third SOC threshold that is higher than the second SOC threshold and that is lower than the first SOC threshold; and when the detected SOC is between the second SOC threshold and the third SOC threshold, sending an alert to a user interface that prompts a driver of a vehicle comprising the high voltage vehicle battery to brake less aggressively to promote brake regeneration opportunities to increase the SOC of the vehicle high voltage battery.

19. The controller according to claim 18, wherein the instructions further include:
comparing the detected state of charge to a fourth SOC threshold that is higher than the second SOC threshold and that is lower than the third SOC threshold; and
when the detected SOC is between the second SOC threshold and the fourth SOC threshold, sending a system-wide request to permit activation of a traction motor as a generator to recharge the vehicle high voltage battery to a predetermined SOC.

20. The controller according to claim 19, wherein the instructions further include:
comparing the detected state of charge to a fifth SOC threshold that is higher than the second SOC threshold and that is lower than the fourth SOC threshold; and
when the detected SOC is between the second SOC threshold and the fifth SOC threshold, automatically activating the traction motor as a generator to recharge the vehicle high voltage battery to the predetermined SOC.

21. The controller according to claim 16, wherein the predetermined state of charge (SOC) range is from 40% to 95% of a maximum charge that can be stored by the vehicle high-voltage battery, and wherein the first SOC threshold is approximately 90% of a maximum charge that can be stored by the vehicle high-voltage battery, and wherein the second threshold is approximately 45% of the maximum charge that can be stored by the vehicle high voltage battery.

22. An apparatus for maintaining a hybrid commercial vehicle high voltage battery within a predetermined state of charge (SOC) range, including:
a state of charge detecting means for detecting a state of charge for the vehicle high voltage battery;
a processing means for:
comparing the detected state of charge to at least a first SOC threshold and a second SOC threshold that is lower than the first SOC threshold;
increasing a cut-in pressure threshold and a cut-out pressure threshold for an air compressor coupled to the vehicle high voltage battery and increasing revolutions per minute (RPM) of a motor connected to the air compressor if the detected SOC is greater than or equal to the first SOC threshold, such that the air compressor begins compressing air at a higher-than-nominal pressure level and draws charge from the vehicle high voltage battery to reduce the detected SOC thereof; and
reducing the cut-in pressure threshold and the cut-out pressure threshold for the air compressor, and reducing motor speed, if the detected SOC is less than or equal to the second SOC threshold, such that the air compressor begins compressing air at a lower-than-nominal pressure level thereby conserving the detected SOC of the vehicle high voltage battery.

* * * * *